May 1, 1945.  A. RUTISHAUSER  2,375,137
MOTOR-CARRYING GROUND MILLER DEVOID OF DRIVING WHEEL MEANS
Filed July 19, 1943
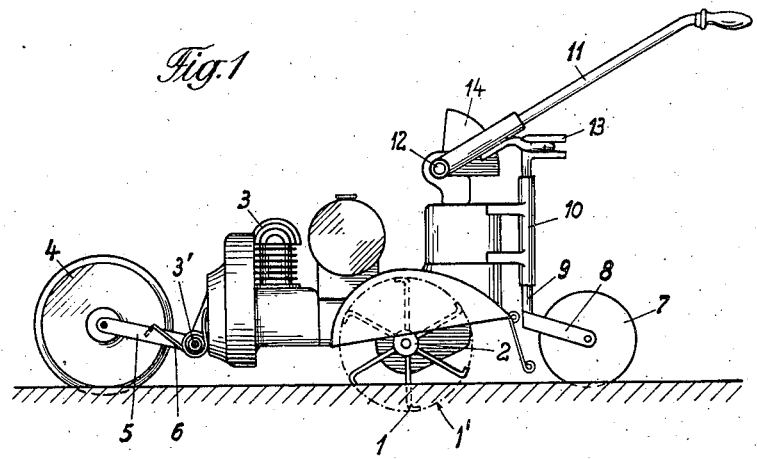
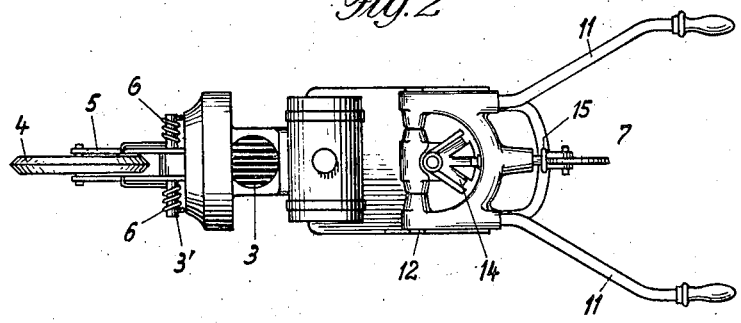
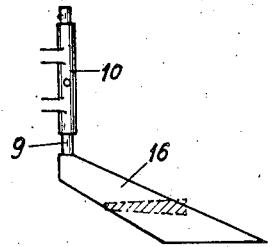
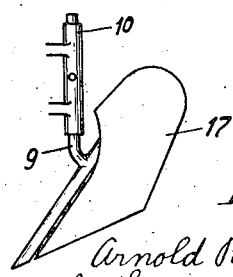
Inventor:
Arnold Rutishauser
by Sommers + Young
Attorneys Patented May 1, 1945

2,375,137

UNITED STATES PATENT OFFICE 2,375,137

MOTOR-CARRYING GROUND MILLER DEVOID OF DRIVING WHEEL MEANS

Arnold Rutishauser, Zollikon, near Zurich, Switzerland, assignor to "Rapid" Motormäher A. G., Zurich, Switzerland Application July 19, 1943, Serial No. 495,343
In Switzerland April 27, 1942

1 Claim. (Cl. 97—48)

This invention relates to motor-carrying ground or soil millers devoid of wheel-driving means and to means on the miller for adjusting the depth of cut and the feed of the miller.

The implements joined to form a milling roller of a motor-carrying ground miller devoid of wheel-driving means have the tendency to raise the milling roller above the ground as they rotate and to let it rotate idly on the surface of the ground and consequently allows the machine to run out of control. Apart from this ground millers devoid of wheel-driving means tend to rise from the ground at the front, due to the action of the rearwardly directed torques (uprising forces), that is, to topple over toward the rear.

With a view to counteracting this tendency of the machine to rise from the ground, according to this invention, the motor is removed from the position above the milling roller to a point forwardly of the latter, and behind the milling roller a supporting member is provided at a distance from said roller for the purpose of preventing the machine from tilting rearwardly. This supporting member provides at the same time a braking member which by penetrating into the soil counteracts the tendency of the machine to advance faster than required. Advantageously, the supporting and braking member is adjustable as to height whereby the velocity of advancing of the machine can be varied.

Advantageously, a front pilot or guide wheel is provided between which and the milling roller the motor is arranged. This guide wheel is preferably mounted for pivoting in a vertical plane by means of a lever arm which is influenced by spring means, in such manner, that it is maintained in contact with the surface of the ground if the latter is uneven or the machine is suddenly raised above the ground, due to the milling roller meeting with an obstacle in the soil.

By means of the said supporting and braking member the depth of cut of the milling roller can be varied by the supporting member penetrating into the soil more or less, that member being in the form of a colter, a narrow wheel, or the like. Advantageously, the supporting and braking member is associated with means for fixedly adjusting it as to height on predetermined levels selectively, at will.

Sometimes it is, however, advantageous to vary the height adjustment of the supporting and braking member continuously and, if required, instantaneously in accordance with frequent variations of consistency or inclination of the ground. This can be made possible by discontinuing the fixed height adjustment of the supporting and braking member and instead connecting said member with adjustable guide arms that can be pivotally displaced along a vertical plane. Due to the fact that said arms of the ground miller provide a long and a short lever arm depending upon whether the distance up to their handles or to their connection with the supporting and braking member is considered, it is possible for the attendant to brake the machine by exerting reduced pressure on the adjusting arms and thus without materially affecting the position of the machine in the longitudinal direction thereof.

An embodiment of the invention is illustrated in the accompanying drawing, by way of example only, in which Fig. 1 shows an elevation of the machine representing this embodiment;

Fig. 2 is a top plan view of Fig. 1, and

Figs. 3 and 4 each show a different modification of the braking member in side elevation.

The instant ground or soil miller as shown in Figs. 1 and 2 is provided with milling implements 1 which are united into wheel spiders fastened to a milling shaft 2 thereby forming a milling roller 1'. Forwardly of the milling roller 1' a motor 3 is arranged which is provided with a bearing 3' in which a pilot or guide wheel 4 is mounted for pivotal movement along a vertical plane by means of a mounting frame 5 so as to be influenced by a spring 6.

At some distance behind the milling roller 1' a supporting and braking member is arranged which may have different forms, upon choice, for example that of a wheel 7. This wheel is sustained by a mounting pin 9 which is guided in a bearing 10. Adjustable guide arms 11 are mounted for rotation about a fulcrum 12 and arranged for interengagement with a fork 13 on the pin 9. These arms can be fixed in a predetermined position of height by means of a bolt 15 engageable with a segment 14.

In adaptation to various kinds of work and conditions of the ground a braking member 16 similar to a colter the cross section of which tapers towards the front, as shown in Fig. 3, may be employed.

This braking member is fastened to the pin 9 by taking a bearing at 10. Alternatively a small hoeing plowshare 17, as shown in Fig. 4, or the like may be used as a braking member for exerting a similar braking effort and being provided with a pin like projection 9 for interengagement with the bearing 10. The pin 9 may be used without the share 17 of the hoeing plow. Dependent upon the kind of soil to be tilled and the condition of growth of weeds thereon, advantageously, a disc wheel 7 is used which is connected with the mounting pin 9 by means of the bearing 8 and acts to subdue the weeds by effect of its rotational movement for embedding them in the soil.

I claim:

In a motor-powered earth cultivator machine, ground-engaging supporting means at the forward end of said machine, ground-engaging supporting means at the rear of said machine, an earth miller located between said supporting means, a motor for driving said miller located between said ground-engaging means forwardly of the miller so as to counteract by its weight the tendency of the machine to overturn rearwardly in operation, a beam pivoted on the forward portion of the machine so as to swing in a substantially vertical plane, and a spring secured to the machine and to said beam to press the forward end of the beam downwardly, the forward supporting means being mounted on said beam, whereby, by pivotal movement of said beam, the earth miller can be kept in engagement with the earth as the machine travels over rough ground.

ARNOLD RUTISHAUSER.